US012627877B2

(12) United States Patent
Weiser et al.

(10) Patent No.: US 12,627,877 B2
(45) Date of Patent: May 12, 2026

(54) INFRARED IMAGE SYSTEM AND IMAGE GUIDE FOR INFRARED IMAGE TRANSFER

(71) Applicants:SCHOTT AG, Mainz (DE); SCHOTT NORTH AMERICA, INC., New York, NY (US)

(72) Inventors: Stefan Weiser, Rosbach (DE); Andrea Ravagli, Shrewsbury, MA (US); Timothy Eagleson, Tolland, CT (US); Bernd Schultheis, Schwabenheim (DE)

(73) Assignees: SCHOTT AG, Mainz (DE); SCHOTT NORTH AMERICA, INC., New York, NY (US)

( * ) Notice: Subject to any disclaimer, the term of this patent is extended or adjusted under 35 U.S.C. 154(b) by 7 days.

(21) Appl. No.: 18/839,082

(22) PCT Filed: Feb. 15, 2023

(86) PCT No.: PCT/EP2023/053739
§ 371 (c)(1),
(2) Date: Aug. 16, 2024

(87) PCT Pub. No.: WO2023/156446
PCT Pub. Date: Aug. 24, 2023

(65) Prior Publication Data
US 2025/0159325 A1 May 15, 2025

Related U.S. Application Data

(60) Provisional application No. 63/268,199, filed on Feb. 18, 2022.

(30) Foreign Application Priority Data

Apr. 4, 2022 (DE) ..................... 10 2022 107 936.8

(51) Int. Cl.
*H04N 23/50* (2023.01)
*G02B 6/06* (2006.01)
(Continued)

(52) U.S. Cl.
CPC ........... *H04N 23/555* (2023.01); *H04N 23/23* (2023.01); *G02B 6/06* (2013.01); *G02B 6/102* (2013.01)

(58) Field of Classification Search
CPC ........ H04N 23/555; H04N 23/23; G02B 6/06; G02B 6/102; G02B 23/12
See application file for complete search history.

(56) References Cited

U.S. PATENT DOCUMENTS

2005/0082480 A1* 4/2005 Wagner ..................... G02F 2/02
348/E5.09
2017/0123146 A1* 5/2017 Chen ..................... G02B 6/032

FOREIGN PATENT DOCUMENTS

DE 102019115146 A1 12/2020
DE 102020116444 A1 12/2021
WO 2021259926 A1 12/2021

OTHER PUBLICATIONS

Matsuura (Flexible hollow optical fiber bundle for infrared thermal imaging—Yuji Matsuura and Keisuke Naito—published Dec. 6, 2010—2011 OSA Jan. 1, 2011 / vol. 2, No. 1 / Biomedical Optics Express). (Year: 2011).*
(Continued)

*Primary Examiner* — Nasim N Nirjhar
(74) *Attorney, Agent, or Firm* — LUCAS & MERCANTI, LLP

(57) ABSTRACT
The invention relates to an infrared image system having a lens for generating an image of a motif having at least two different temperatures T1 and T2, an image guide associated with the lens at a distal end for image transfer and a detector unit for image capture. The detector unit is associated with
(Continued)

a proximal end of the image guide and the ratio of the shared thermal resolution (NETD) of the image guide and the detector unit to the thermal resolution (NETD) of the detector unit is less than 10, preferably less than 5, particularly preferably less than 2.

17 Claims, 4 Drawing Sheets

(51) Int. Cl.
  *G02B 6/10* (2006.01)
  *H04N 23/23* (2023.01)

(56) References Cited

OTHER PUBLICATIONS

International Search Report Corresponding for International Application No. PCT/EP2023/053739, 8 pages, May 12, 2023, with English Translation.
Srleffler, "Optical fiber", Wikipedia, revised on Feb. 12, 2022, https://en.wikipedia.org/w/index.php?title=Optical_fiber&oldid=1071500127.

* cited by examiner

1

70    60         10         20              30     40     50

20

100,
100a 100,
100b 100,
100a 100,
100b (a)

(b)

(a)                                                      (b)

INFRARED IMAGE SYSTEM AND IMAGE GUIDE FOR INFRARED IMAGE TRANSFER

CROSS-REFERENCE TO RELATED APPLICATIONS

This application is a 371 national phase entry of PCT/EP2023/053739, filed Feb. 15, 2023, which claims the benefit of U.S. Provisional Application No. 63/268,199 filed Feb. 18, 2022, and of German Patent Application No. 10 2022 107 936.8 filed Apr. 4, 2022.

FIELD OF THE INVENTION

Infrared imaging can be used in a number of applications, for the purposes of providing information or auxiliary data which are not derivable by using the naked eye or conventional imaging equipment.

BACKGROUND OF THE INVENTION

In this context, it is sometimes desirable to separate the piece of imaging equipment, in particular the sensor, from the light-collecting lens in order to enable a space- and application-optimized usability, especially in small and dangerous surroundings. A suitable image guide can be used to transmit the IR light image captured by the lens to the sensor over a desired distance.

Expanding the light spectrum may allow earlier prevention, performance optimization and/or risk reduction in relation to material defects, for example in industrial applications.

Moreover, monitoring surroundings characterized by a high outage risk and non-usability of conventional IR imaging equipment on account of e.g. overall space-related, thermal, magnetic and/or other electro-optical blocking, for example, can be enabled by separating electro-optical imaging equipment from the observation object by way of IR light-guiding extensions. Consequently, flexibilizing the positioning is rendered possible by an extension.

By way of a suitable placement for the localization of danger and risk sites (best-case prevention) and the identification of material effects, occurring there, as a result of a broader wavelength spectrum, the use of IR image guides brings about a dedicated local risk minimization and a better performance in relation to the avoidance of damage and the reduction in the service life of electro-optical imaging equipment. This is particularly applicable to small and dangerous surroundings, e.g. in industry and aviation.

Furthermore, fields of application for infrared imaging can be, for example, preventative servicing of sheaths and insulations in narrow and/or difficult-to-access surroundings, monitoring of motors and engine rooms, possibly even during operation, monitoring and inspection of turbine chambers, for instance a blade inspection, e.g. in relation to weight, space and avionics balance, fire safety, firefighting, spark identification, for example in industrial infrastructure, in production, e.g. in relation to material supply lines or exhaust gas lines, within chambers, furnaces or switchboards, measurement applications and scientific applications, e.g. in the field of chemical and/or physical processes, for example under magnetic or vacuum conditions, in the field of circuit boards, wafers and the like. In this case, as a result of spatial separation from a detector unit, the use of IR image guides can enable a suitable placement, for example inconspicuous placement, of the infrared image system, for example also around the corner or around obstacles.

In many applications, it is moreover also possible to obtain indirect insight, i.e. states or events can also be detected or observed within or outside of a housing or chamber, for example.

In general, there sometimes is a desire for optical systems which are able to identify temperature differences between an object and the surroundings (thermal imaging technology). In this context, the aspect of an image transmission element (image guide) comes to bear if the direct exposure or direct observation, inter alia by way of an IR camera, is not possible or not preferable, or, expressed differently, if remote imaging is required, for example in difficult surroundings or at difficult-to-access sites, assemblies or the like, e.g. imaging around a corner, through small openings or between assemblies, etc. This is sometimes also the case in medical fields, for imaging into, out of or within a body.

In this context, an image guide can enable remote imaging, with the distal end being kept away from the detector.

IR cameras or IR detector image chips are usually not comparable to those from the visible range. The pixel size is frequently larger as a result of the adaptation to the wavelength range to be detected, and consequently the resolution tends to be rather low.

Therefore, there has been increased interest in the development of highly sensitive, high-resolution sensors or detectors for some time now, in part also in view of relatively specific applications. By contrast, the development of image transmission elements in this context still has been less of a focus of development. In particular, image guides that are better matched to the respective system would be desirable. What also needs to be considered in this context is that in the IR range many bodies may act as IR transmitters themselves and might thus interfere with a target signal by way of superposition.

SUMMARY OF THE INVENTION

Accordingly, it is an object of the invention to provide a system for IR remote imaging, which in particular enables spatial separation of lens and sensor by means of an image guide from the object to be observed, with the components of the system, especially lens, image guide, sensor, and/or further optical components, being matched to one another. One aspect of the object of the invention lies in increasing the image quality and optimizing IR systems for practical applications and, in the process, making best possible use of or maintaining the performance of the downstream components, in particular of the IR camera or IR chip.

The invention relates to an infrared image system having a lens for generating an image of an object or of a plurality of objects or motifs, an image guide for image transmission, with a distal end of the image guide being assigned to the lens, and a detector unit for image capture, the detector unit being assigned or assignable to a proximal end of the image guide. In this case, the motif has in particular at least two different temperatures T1 and T2, e.g. T2=10° C. to 25° C. as a background or backdrop and T1>T2 as an object in front of the background or backdrop.

In this case, the ratio of the joint thermal resolution $(NETD_B–NETD$: Noise Equivalent Temperature Difference) of the image guide and the detector unit to the thermal resolution $(NETD_D)$ of the detector unit is particular preferably less than 10, preferably less than 5, particularly preferably less than 2.

Further preferably, the ratio of the joint thermal resolution of the image guide and the detector unit to the thermal resolution of the detector unit is greater than 1.00, particularly preferably greater than 1.05, even more preferably greater than 1.1. For example, a value in the range of 1.01 to 10 or else a value in the range of 1.05 to 5 might therefore be provided for the said ratio.

In this case, the detector unit preferably comprises an IR-sensitive sensor and optionally also one or more further optical components, e.g. a dedicated optical unit and/or housing, with the NETD value preferably relating to the entire detector unit. However, this should not exclude the case where the NETD value also relates only to the sensor, for instance in the case of a detector unit consisting merely of one sensor.

As an alternative or in addition to the aforementioned ratio, provision can be made for the detector unit to have a thermal resolution (NETD) less than 300 mK, preferably less than 200 mK, particularly preferably less than 100 mK, even more preferred less than 50 mK. As an alternative to that or in addition, the image guide and the detector unit can moreover have a joint thermal resolution (NETD) less than 400 mK, preferably less than 300 mK, particularly preferably less than 200 mK.

Using the aforementioned properties, it is advantageously possible to enable better matching of the image guide to the other components of the infrared image system, e.g. the detector unit. Thus, overall, it is possible to obtain better matching of the image guide to the infrared image system, and vice versa.

What can advantageously be brought about or provided for here is that the NETD (Noise Equivalent Temperature Difference) and/or MRTD (Minimum Resolvable Temperature Difference) of the detector is not substantially restricted.

A formula for determining the NETD value is specified below. What can be used as a basis here for the joint thermal resolution NETD of image guide and detector unit, under certain circumstances.

A few further properties in relation to the detector unit which might also, in particular, render a minimum resolvable temperature difference (MRTD) of the detector unit resolvable are specified below.

For instance, provision can be made for the detector unit to have a detectivity of at least $10^8$ cm $Hz^{1/2}$ $W^{-1}$, preferably of at least $10^9$ cm $Hz^{1/2}$ $W^{-1}$, particularly preferably of at least $10^9$ cm $Hz^{1/2}$ $W^{-1}$, even more preferably of at least $10^{10}$ cm $Hz^{1/2}$ $W^{-1}$, even more preferably of at least $10^{11}$ cm $Hz^{1/2}$ $W^{-1}$, e.g. of between one of the aforementioned values and $10^{13}$ cm $Hz^{1/2}$ $W^{-1}$, in particular between one of the aforementioned values and $10^{12}$ cm $Hz^{1/2}$ $W^{-1}$, for a wavelength in the infrared range, in particular in the range of 0.8 µm to 14 µm.

The detector unit can have a resolution of at least 20 line pairs/mm, preferably at least 50 line pairs/mm, particularly preferably of at least 150 line pairs/mm.

The detector unit can have an area of at least 0.1 square centimeters, preferably at least 0.5 square centimeters, particularly preferably of at least 5 square centimeters.

In a development, the infrared imaging system may further comprise an optical element arranged between the proximal end of the image guide and the detector unit. In a specific embodiment, the detector unit may also be embodied as a screen, in particular as an "IR-sensitive" screen, which converts wavelengths from the infrared (IR) into visible light (VIS) by means of wavelength-converting material or such a coating, and the aforementioned optical element can be embodied for image projection onto the screen.

The image guide of the infrared system can be embodied in accordance with the explanations below in particular.

The invention also relates, in particular, to an image guide for the image transmission from a distal end to a proximal end, comprising a multiplicity of structure elements which each extend from the distal end to the proximal end, with at least two different types of structure elements being encompassed, specifically a first type with the first refractive index n1 and a second type with a second refractive index n2.

The ratio of the refractive indices n1/n2 between the structure elements of the first type and the structure elements of the second type can be for example between 0.5 and 0.999, particularly preferably between 0.6 and 0.992, even more preferably between 0.75 and 0.992. It is also possible for n1/n2 to be between 0.8 and 0.999.

Further, provision can be made for the first refractive index of the structure elements of the first type and the second refractive index of the structure elements of the second type to deviate by at least 0.05, deviate by at least 0.075, deviate in particular by at least 0.1, deviate in particular by at least 0.2, deviate in particular by at least 0.3, deviate in particular by at least 0.4.

For example, the structure elements can form a bundle of optical fibers, the fibers each comprising a core and a cladding, the cladding in each case being embodied as a structure element of the first type and the core in each case being embodied as a structure element of the second type.

However, provision can also be made for the structure elements to form a main body with a multiplicity of cavities, preferably filled cavities, with the main body being embodied as structure element of the first type and the cavities, preferably filled cavities, being embodied as a structure elements of the second type. Such an image guide can e.g. be similar to or embodied as a photonic crystal fiber (PCF).

In each case, preferably at least one structure element has a transmissive embodiment in relation to a wavelength in the infrared range, in particular in the range from 0.8 µm to 14 µm.

The image guide can have a resolution of at least 25 line pairs/mm, preferably a resolution of at least 30 line pairs/mm, particularly preferably a resolution of at least 40 line pairs/mm.

The image guide can have a length of at least 50 cm, preferably a length of at least 100 cm, particularly preferably a length of at least 300 cm.

The image guide can be embodied at least sectionally as a flexible body and/or can be embodied at least sectionally as a rigid body.

Preferably, at least a core, a cladding, a main body, a filled cavity, and/or a structure element comprises a material which has a damping of less than 50 dB/m, in particular less than 10 dB/m, in particular less than 1 dB/m, for a wavelength in the infrared range, in particular in the sensitivity or detection range of the detector unit or of the emission range of a body or motif to be observed, and in the range from 0.8 µm to 14 µm.

In the view of crosstalk, provision can be made for there to be a crosstalk (X-Talk) of less than 0.4, preferably of less than 0.3, particularly preferably of less than 0.2, or of less than 0.1, or of less than 0.05, between the cores of the fibers and/or the structure elements of the second type for a wavelength in the infrared range, particularly in the range from 0.8 µm to 14 µm, in particular in the range from 5 µm to 8 µm.

The image guide preferably has a multiplicity of structure elements. The number of fibers and/or structure elements of the second type per $mm^2$ of the cross-sectional area of the image guide can be at least 100, preferably at least 1000, particularly preferably at least 10 000.

The cores of the fibers and/or the structure elements of the second type can have a diameter of between 5 μm and 200 μm, preferably between 5 μm and 100 μm, particularly preferably between 10 μm and 50 μm.

The claddings of the fibers and/or the structure elements of the first type can have a diameter of between 6 μm and 250 μm, preferably between 6 μm and 150 μm, particularly preferably between 10 μm and 70 μm.

The ratio of the diameters of core to cladding can be between 0.5 and 0.95.

The smallest distance between the centers of two cores and/or two structure elements of the second type can be less than 50 μm, preferably less than 20 μm, particularly preferably less than 15 μm.

As an alternative to that or in addition, the mean distance between the centers of the cores and/or structure elements of the second type can also be less than 50 μm, preferably is less than 20 μm, particularly preferably is less than 15 μm.

In principle, a core, a cladding, a main body, a filled cavity, and/or a structure element may comprise or consist of glass. It is also possible for a core, a cladding, a main body, a filled cavity, and/or a structure element to comprise or consist of quartz.

A core, a cladding, a main body, a filled cavity, and/or a structure element may comprise a chalcogenide, in particular comprising at least one element from the group of oxygen, sulfur, selenium and tellurium, and at least one element from the group of arsenic, germanium, phosphor, antinomy, lead, boron, aluminum, gallium, indium, titanium, sodium.

Likewise, multicomponent glasses may be provided for core, cladding or main body, and also fused quartz, in particular doped fused quartz. This is true to the extent that these are compatible with one another and/or also compatible with chalcogenides or GLS materials, especially from a chemical and/or thermodynamic point of view, for example in relation to the coefficient of thermal expansion and/or the viscosity curves thereof against temperature. For example, this means that they can be processed or worked on in thermal processes in particular, with the result that a waveguide, in particular, can be prepared by means of usual production methods for fiber-optic components.

In this case, GLS denotes a gallium lanthanum sulfide glass, with a core, a cladding, a main body, a filled cavity, and/or a structure element being able to comprise such a gallium lanthanum sulfide (GLS) glass.

By preference, the image guide has a transmission of at least 30%, preferably at least 50%, particularly preferably at least 60%, for a wavelength in the infrared range, in particular in the range from 0.8 μm to 14 μm. Further, the image guide can have a transmission of at least 30%, preferably at least 50%, particularly preferably at least 60%, for a wavelength in the range from 5 μm to 8 μm.

In a further advantageous embodiment, it is possible to provide image guides with a higher resolution, which are based on the wave phenomenon of transverse Anderson localization (TAL). In this case, use is made, for example, of the fact that a random distribution of refractive indices over the cross section of the image guide in the case of a simultaneous invariance of the refractive index along the length of the image guide leads to a restriction of the cross section of the input coupled light on account of destructive interference. In practice, a multiplicity of individual optical fibers with different refractive indices can be combined to form a random fiber bundle, for example. If a light beam is input coupled into such a waveguide, it propagates along the length of the image guide with a cross-section-restricted transverse extent.

Particularly preferably, such image guides comprise at least two different types of structure elements, specifically a first type with a first refractive index and a second type with a second refractive index, in a further embodiment. Accordingly, the encompassed multiplicity of structure elements can at least comprise one structure element of the first type and one or more structure elements of the second type, or, conversely, one or more structure elements of the first type and one structure element of the second type, or else comprise both a plurality of structure elements of the first type and a plurality of structure elements of the second type. Naturally, more than two different types of structure elements, e.g. three different types, may also be encompassed. Each structure element extends through the image guide in the transport direction of the electromagnetic radiation and, in part, over the cross section of the waveguide so that a multiplicity of cross-sectional regions are defined over the cross section of the waveguide, the regions in each case corresponding to the cross-section of a single structure element. Accordingly, the structure elements extend next to one another, in particular parallel to one another, along the transport direction of the waveguide or image guide and their cross sections each take up an areal portion of the cross section of the waveguide and therefore each define a cross-sectional region of the cross section of the waveguide. Thus, the cross-sectional regions correspond in particular to the surface regions formed by the structure elements if the gaze is directed at a cross-sectional area of the waveguide, that is to say e.g. at the light entrance or light exit surface.

An image guide may therefore comprise a multiplicity of structure elements of the first type and a multiplicity of structure elements of the second type, wherein the structure elements of the first type are formed as bodies, in particular rod-shaped or tubular bodies, with or from a first medium, wherein the first medium has the first refractive index, and wherein the structure elements of the second type are formed as bodies, in particular rod-shaped or tubular bodies, with or from a second medium, wherein the second medium has the second refractive index, or wherein the structure elements of the second type are formed as cavities in the structure elements of the first type, wherein the cavities preferably form the second refractive index or are filled with a second medium, wherein the second medium has the second refractive index.

Accordingly, an image guide can further define a longitudinal direction and a cross section running across the longitudinal direction, wherein the structure elements extend over the cross section of the image guide in such a way that, in the cross section of the image guide, a multiplicity of cross-sectional regions are defined, which each correspond to the cross section of an individual structure element, and/or wherein the structure elements, in particular the cross-sectional regions thereof, are arranged nonuniformly in order to bring about a transverse Anderson localization across the longitudinal direction.

The nonuniform arrangement of the structure elements, in particular the cross-sectional regions thereof, can be in particular formed randomly and/or nonuniformly but defined by a predetermined rule, wherein the nonuniform arrangement is preferably formed:

(a) as a periodic positioning of structure elements, in particular the cross-sectional regions thereof, wherein the periodically positioned structure elements among themselves have a variation which is formed randomly and/or nonuniformly but uniquely defined by a predetermined rule, wherein the variation of the periodically positioned structure elements among themselves is preferably formed as a variation of the type of structure elements, the refractive index of the structure elements and/or of the geometry, e.g. of the form, diameter and/or substructure, of the structure elements, (b) as an aperiodic positioning of structure elements, in particular the cross-sectional regions thereof, wherein the aperiodic positions of the structure elements are formed randomly and/or nonuniformly but uniquely defined by a predetermined rule, wherein optionally the structure elements moreover have a variation among themselves, which is formed randomly and/or nonuniformly but uniquely defined by a predetermined rule, and/or (c) as a positioning of structure elements, in particular the cross-sectional regions thereof, on periodic places, wherein some of the periodic places are occupied and some of the periodic places are unoccupied and the occupancy is formed randomly and/or nonuniformly but uniquely defined by a predetermined rule, wherein optionally the structure elements also have a variation among themselves, which is formed randomly and/or nonuniformly but uniquely defined by a predetermined rule.

According to a development, the structure elements, in particular the cross-sectional regions thereof, can be formed nonuniformly but uniquely defined by a predefined rule in the process. Accordingly, the structure elements are nonuniform overall, i.e. they have nonuniform embodiments, for example they are arranged nonuniformly, formed nonuniformly and/or constituted nonuniformly. In this case, the nonuniformity is in particular not in the individual structure elements themselves in each case but lies in the totality of the structure elements; accordingly, a physical disorder in particular, that is to say a deviation from a symmetry or the symmetry, is present. On the other hand, the nonuniformly formed structure elements are formed in defined fashion by way of a predetermined rule, i.e. they are not formed randomly. The property that the structure elements have a nonuniformity or disorder vis-à-vis one another is thus contrasted with regularity, in particular within the meaning of the nonuniformity or the disorder following a defined rule and not randomness. In particular, the nonuniformity or the disorder is accordingly uniquely predetermined or specified by a rule, or characterized or characterizable by a rule. The nonuniformity of the structure elements, in particular of the cross-sectional regions thereof, can be manifested in various ways. For example, the cross-sectional regions of the structure elements may have a nonuniform, in particular aperiodic arrangement, which is uniquely defined by the predetermined role. For example, the cross-sectional regions may have an arrangement that deviates from a periodic grid. However, the cross-sectional regions may also be nonuniformly distributed on a periodic grid, for example. As an alternative to that or in addition, the cross-sectional regions of the structure elements may have mutually nonuniform geometries, in particular geometries that deviate from one another, for example nonuniform diameters, which are uniquely defined by the predetermined rule. However, the geometries of the cross-sectional regions may also be similar in form, but twisted relative to one another, especially in the case of cross-sectional regions which have a non-round shape. Further, the structure elements may alternatively or additionally have nonuniform refractive indices with respect to one another, in particular have refractive indices that deviate from one another, the said refractive indices being uniquely defined by the predetermined rule. Such image guides enable resolutions which are another level above the aforementioned resolutions of image guides based on the principle of guiding waves by total-internal reflection. Incidentally, the features in respect of materials and mechanical structure, for example number, areas and geometries, and also production methods are substantially also applied or applicable to such waveguides or image guides that are based on the wave phenomenon of transverse Anderson localization (TAL).

BRIEF DESCRIPTION OF THE DRAWINGS

Embodiments of the invention are described in more detail below on the basis of the figures, in which.

DETAILED DESCRIPTION OF THE INVENTION

Figure 1:
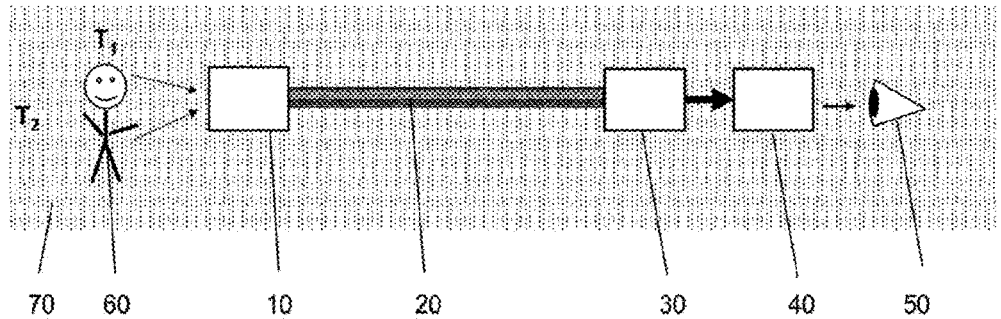
FIG. 1 shows an infrared image system having a lens, an image guide, and the detector unit, FIG. 2 schematically shows an image guide in the form of a fiber bundle, having a multiplicity of the first and second structure elements.

FIG. 1 shows an infrared image system 1 which is in the form of an IR observation system and which comprises at least a lens 10 in the form of an optical element or lens system for recording an image of an object 60 at the temperature T1 against a background or in surroundings 70 at the temperature T2. In this case, the lens is constructed using or from a material that is transmissive to infrared radiation, especially in the wavelength range of the radiation to be detected.

Moreover, the infrared image system 1 comprises an infrared image guide 20 and a further optical element 30 for image transmission into/onto a detector unit 40, or for projection onto a screen. In this case, the image guide 20 can have a partially or sectionally rigid embodiment and/or a partially or sectionally flexible embodiment. Further, the image guide 20 can also have a partially or sectionally half-rigid embodiment.

The ratio of the joint thermal resolution (NETD) of the image guide (20) and the detector unit (40) to the thermal resolution (NETD) of the detector unit on its own is less than 3 in this case, especially at the temperature difference $\Delta T=T1-T2$.

Figure 2:
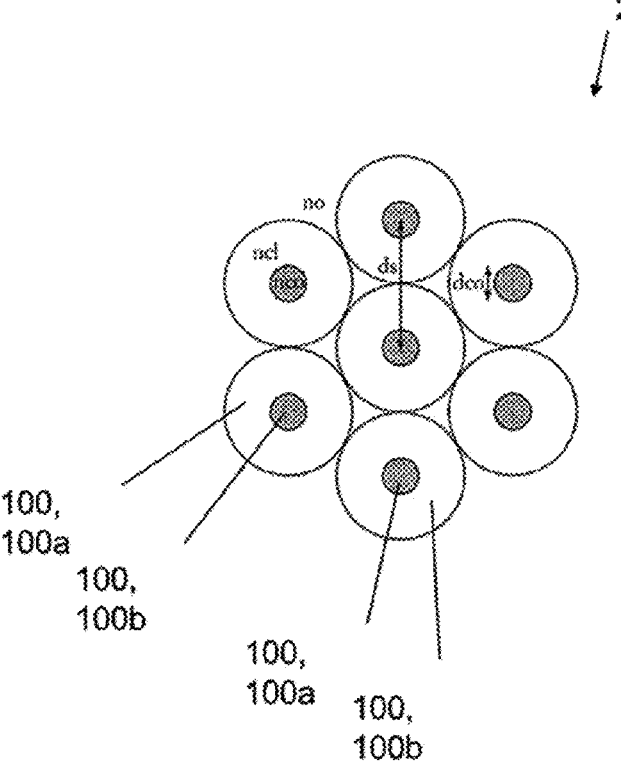

FIG. 2 shows an image guide 20 which is embodied as fiber-optic image guide and e.g. allows an image transmission in the IR wavelength range of between 1 μm and 14 μm. The image guide has two different types of structure elements, specifically a first type 100*a* with a first refractive index and a second type 100*b* with a second refractive index, with the structure elements of the first type 100*a* each forming the cladding of a fiber and the structure elements of the second type 100*b* each forming the core of a fiber.

In such a fiber-optic image guide or fiber bundle, especially if the latter has an at least partially or sectionally rigid embodiment, the structure elements of the first type 100*a* may also be partially or sectionally interconnected in interlocking and/or integral fashion, e.g. by fusing. In this case, substantially hexagonal superstructures often form and tighter packing of the pixels can be achieved. For example, this may be advantageous for affixing the proximal and/or distal end and attaching the latter in sleeves or means for a connection to further components of the IR image system, which may also be accompanied by a spatial fixation of the pixels. In the case of purely rigid image guides, these may also be bent once or multiple times in portions or sections and/or be modified in terms of their cross-sectional geometry, and have an inherent twist. The latter means that the proximal and the distal end are modified in terms of their orientation to one another by a twist angle relative to one another (twisted image guide). In this case, the cross-sectional geometries of the distal and proximal end are preferably substantially congruent to one another, i.e. apart from e.g. production-related deviations or tolerances, in order to enable the correct representation of the motif. However, these may have different sizes or dimensions, e.g. diameters, that is to say e.g. a rigid image guide may have a tapering embodiment. This may be advantageous both on the distal and the proximal side of the image guide, in order to adapt the dimensions to a motif to be captured or to the detector.

Figure 3:
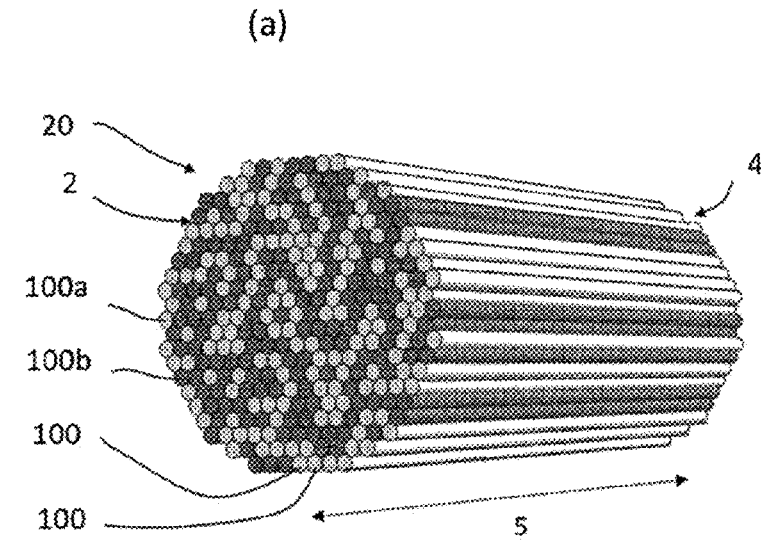
FIG. 3 shows schematic perspective views of two image guides with (a) two types of structure elements whose cross-sectional regions are arranged nonuniformly on a grid and (b) a multiplicity of structure elements of nonuniform refractive indices (plurality of types) and/or nonuniform geometries (diameters)
Figure 3:
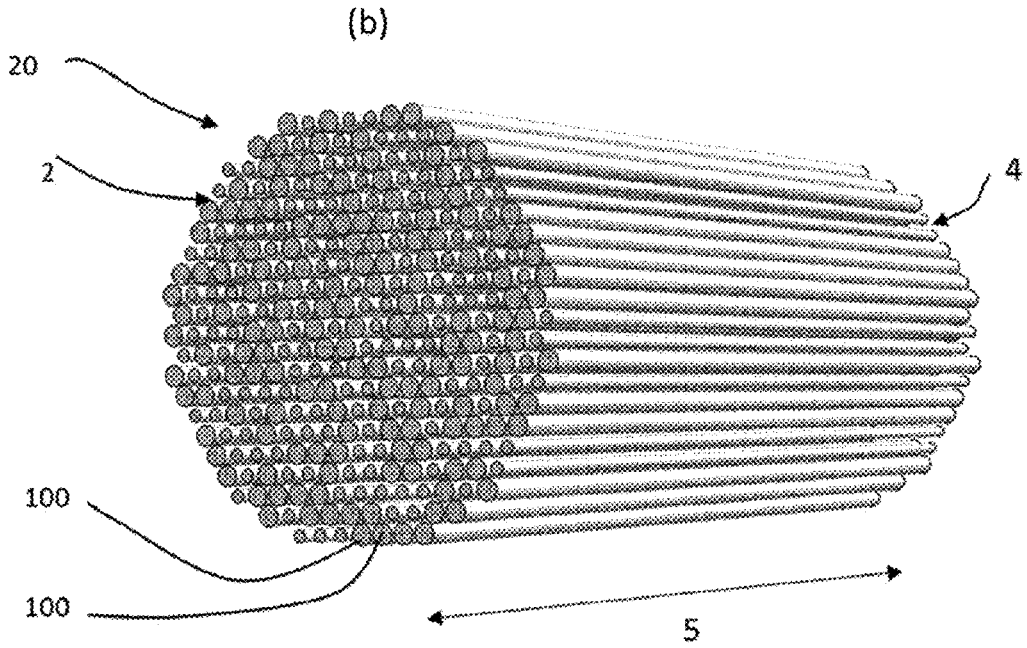

FIG. 3 shows two further examples of image guides 20. The image guides 20 in turn comprise a multiplicity of structure elements 100, which each extend along the transport direction 5 from a first end 2 on one face to a second end 4 on another face of the image guide 20 and are rod-shaped, for example.

The image guide shown in FIG. 3(*a*) has a multiplicity of structure elements of a first type 100*a* and a multiplicity of structure elements of a second type 100*b*. In this example, the cross-sectional regions of the structure elements are arranged on a periodic grid. However, the structure elements have a nonuniform arrangement in that the structure elements of the first type 100*a* and of the second type 100*b*, and hence the refractive indices, are arranged and/or distributed nonuniformly, and/or a nonuniform occupancy of periodic positions is present. It is possible that the structure elements 100*a* comprise infrared-transmissive material. It is also possible that the structure elements 100*b* comprise infrared-transmissive material. Further, both the structure element 100*a* and the structure elements 100*b* might also comprise infrared-transmissive material, wherein preferably different infrared-transmissive materials are provided for the two types.

The image guide shown in FIG. 3(*b*) in turn has a multiplicity of structure elements 100, which are arranged on a periodic grid, wherein the cross-sectional regions of the structure elements have nonuniform geometries in this example. The geometries can differ in particular in that the diameters of the structure elements or the cross-sectional regions thereof differ from one another. In addition, the structure elements 100 may have nonuniformity in that the refractive indices of the structure elements differ from one another. In this case, a discrete number of different refractive indices, e.g. two, three, four, etc. might be provided, but a continuous variation of the refractive index could also be provided in principle. At least some of the structure elements 100 have infrared-transmissive material in this variant.

Figure 4:
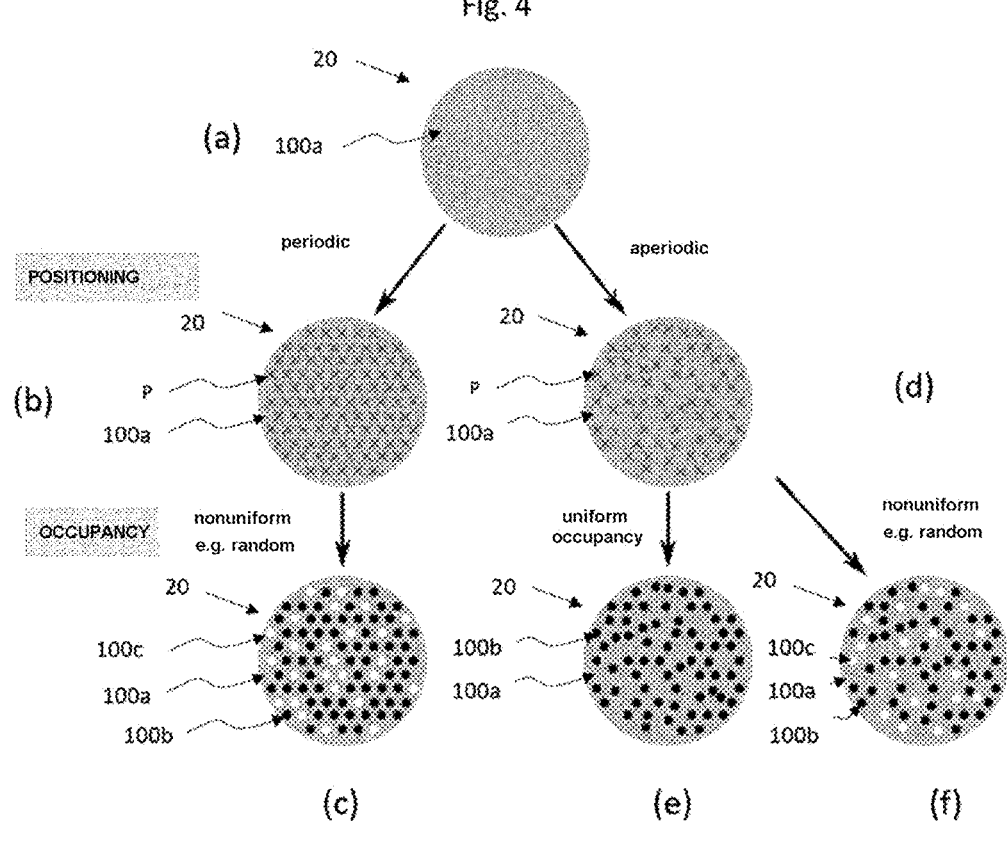
FIG. 4 shows a schematic illustration of various possibilities for image guides with nonuniformly arranged structure elements or cross-sectional regions thereof.

FIG. 4 shows different options for realizing a nonuniform arrangement using a tree diagram. In FIG. 4*a*, a structure element 100*a* is shown as starting point; it can be formed e.g. as a matrix material (it is also possible that the structure element 100*a* is formed as air or is absent). FIG. 4*b* shows a further starting point derived therefrom with the structure element 100*a* and a multiplicity of periodic positions P to be occupied with structure elements, which then have a periodic positioning. FIG. 4*d* shows a further starting point derived from FIG. 4*a* with the structure element 100*a* and a multiplicity of aperiodic positions P to be occupied with structure elements in order to obtain aperiodic positioning. Proceeding from the starting points shown in FIGS. 4*b* and 4*d*, image guides arise by occupying positions P with structure elements, as described in more detail below.

Proceeding from FIG. 4*b*, FIG. 4*c* shows an image guide 20 with structure elements 100*b*, 100*c* whose cross-sectional regions have a periodic positioning and/or are located at periodic positions. The image guide shown in FIG. 4*c* has three types of structure elements 100*a*, 100*b*, 100*c*, which can each have a different refractive index. For example, the structure element 100*a* may be formed as a matrix material, and the structure elements 100*b* and 100*c* may be cavities in the matrix material filled with materials with deviating refractive indices.

However, it is also possible that one of the materials of the structure elements 100*b* and 100*c* in turn corresponds to the matrix material of the structure element 100*a* or that the (filled) cavities corresponding to these structure elements are missing in the matrix material (in this respect, cf. the text relating to FIG. 6*a* below). It is also possible that the structure element 100*a* is formed as air or is absent, and the structure elements 100*b* and 100*c* adjoin one another (in this respect, cf. FIG. 3*a*).

The image guide 20 shown in FIG. 4*c* has structure elements 100*b*, 100*c* with periodic positioning. However, the structure elements 100*b*, 100*c* are of different types, and the occupancy of different types on the regular grid is nonuniform. In particular, the variation of the structure elements 100*b*, 100*c* among themselves is thus nonuniform. FIG. 4*c* thus shows a case of an image guide 20, wherein the structure elements or the cross-sectional regions thereof have a nonuniform arrangement. The term arrangement should be understood here to the effect that the selection or occupancy of the different types of structure elements 100*b*, 100*c* on the respective periodic positions is nonuniform.

It is also possible that the structure elements 100*b*, 100*c* do not differ in terms of their refractive indices, that is to say e.g. have the same refractive index or consist of the same material, but vary with regard to other aspects (in this respect, cf. the text relating to FIG. 5 below). It is also possible that the structure elements 100*b*, 100*c* differ both in terms of their refractive indices and in terms of other aspects.

In particular, the structure element 100*a* may comprise infrared-transmissive material, and/or the structure elements 100*b* and/or 100*c* may comprise infrared-transmissive material or another infrared-transmissive material.

Proceeding from FIG. 4*d*, FIG. 4*e* shows an image guide 20 with two types of structure elements, namely the structure element 100*a*, which may be formed e.g. as a matrix material, and a multiplicity of structure elements 100*b*, which for example may be formed as cavities, in particular, filled cavities, in the matrix material. In this case, the cross-sectional regions of the structure elements 100*b* are positioned aperiodically. The positioning of the structure elements 100*b* can now represent a nonuniformity. In particular, the structure elements 100*b* of the second type may have nonuniform positions. FIG. 4*e* thus shows a case of an image guide 20, wherein the structure elements or the cross-sectional regions thereof have a nonuniform arrangement. The term arrangement should be understood to the effect that the structure element or some of the structure elements or the cross-sectional regions thereof are positioned aperiodically. In the case of FIG. 4*e*, provision is made in particular for the structure elements 100*b* of the second type to have a uniform refractive index, have uniform geometries and/or be formed uniformly, in particular identically, with regard to further aspects. This may be referred to as a uniform occupancy of aperiodic positions.

The structure element 100*a* may comprise infrared-transmissive material, and/or the structure elements 100*b* may comprise infrared-transmissive material or another infrared-transmissive material.

By contrast, proceeding from FIG. 4*d*, FIG. 4*f* shows an image guide 20 in which an aperiodic positioning of structure elements with simultaneously different types of structure elements 100*b*, 100*c* is provided. In this case, the nonuniformity of the arrangement may lie in the aperiodic positioning of the structure elements 100*b*, 100*c* or in the occupancy, that is to say the variation of the structure elements 100*b*, 100*c* among themselves, or in both the positioning and the occupancy.

The structure element 100*a* may comprise infrared-transmissive material, and/or the structure elements 100*b* and/or 100*c* may comprise infrared-transmissive material or another infrared-transmissive material.

Figure 5:
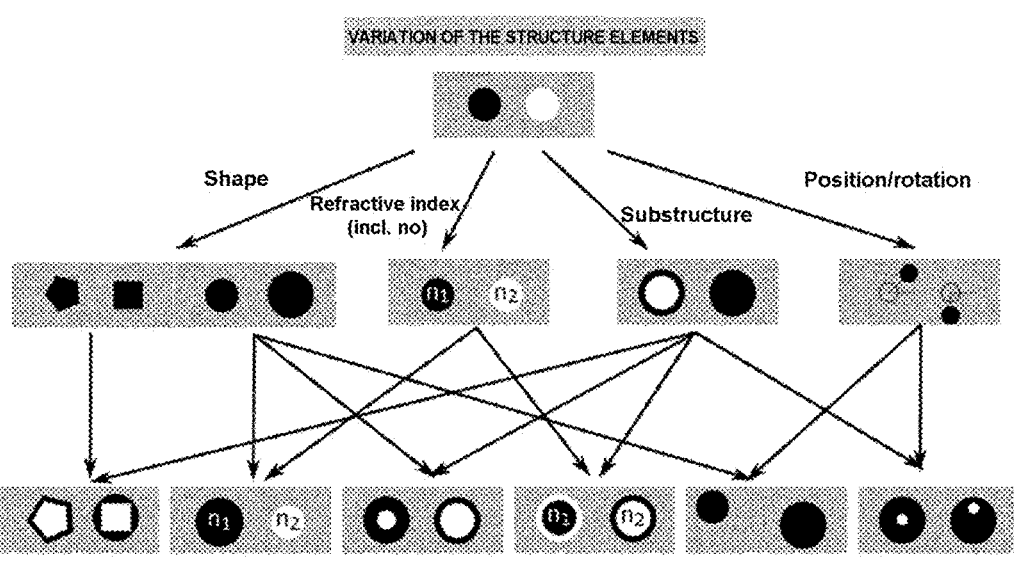
FIG. 5 shows a schematic illustration of different aspects for variations among structure elements or cross-sectional regions thereof and possibilities of combinations of these aspects.

FIG. 5 shows various options for variations, which structure elements may have among themselves (middle row), and exemplary combinations of the variations (bottom row) which should not be construed as exhaustive. The variations shown can be used in particular for a nonuniform occupancy of positions with structure elements. Structure elements whose cross-sectional regions are localized at periodic or aperiodic positions, e.g. within a matrix material, may vary among themselves for example with regard to their shape, vary with regard to their type or refractive index, vary with regard to their substructure and/or vary with regard to their rotation (and/or local position).

For example, variations in the geometries of the structure elements, in particular the cross-sectional regions thereof, may be formed as variations of the shape (number of corners, diameter). Variations in geometry can also be formed as variations in the substructure. A substructure may in particular consist of a structure element, in particular the cross-sectional region thereof, having at least two different regions of different refractive indices, in particular a core and a surrounding cladding (core-cladding system).

In combination, for example, a first type of structure elements may have a polygonal cladding and/or a polygonal core, and a second type of structure elements may have a round cladding and a polygonal core (bottom row, first column). These two types of structure elements can then be used, for example, to occupy periodic or aperiodic positions.

Further, for example, a first type of structure elements may have a first refractive index and a first diameter, and a second type of structure elements may have a second refractive index and a second diameter (bottom row, second column); or a first type of structure elements may have a core-cladding system having a core with a first diameter, and a second type of structure elements may have a core-cladding system having a core with a second diameter (bottom row, third column); or a first type of structure elements may have a core-cladding system having a core with a first refractive index, and a second type of structure elements may have a core-cladding system having a core with a second refractive index (bottom line, fourth column); or a first type of structure elements may have a first diameter and a rotation around a point of rotation outside the structure element, and a second type of structure elements may have a second diameter and a rotation around a point of rotation outside the structure element (bottom row, fifth column); or a first type of structure elements may have a core-cladding system having a centered core, and a second type of structure elements may have a core-cladding system having a core with a rotation around a point of rotation outside the core (bottom row, sixth column), and the like.

Figure 6:
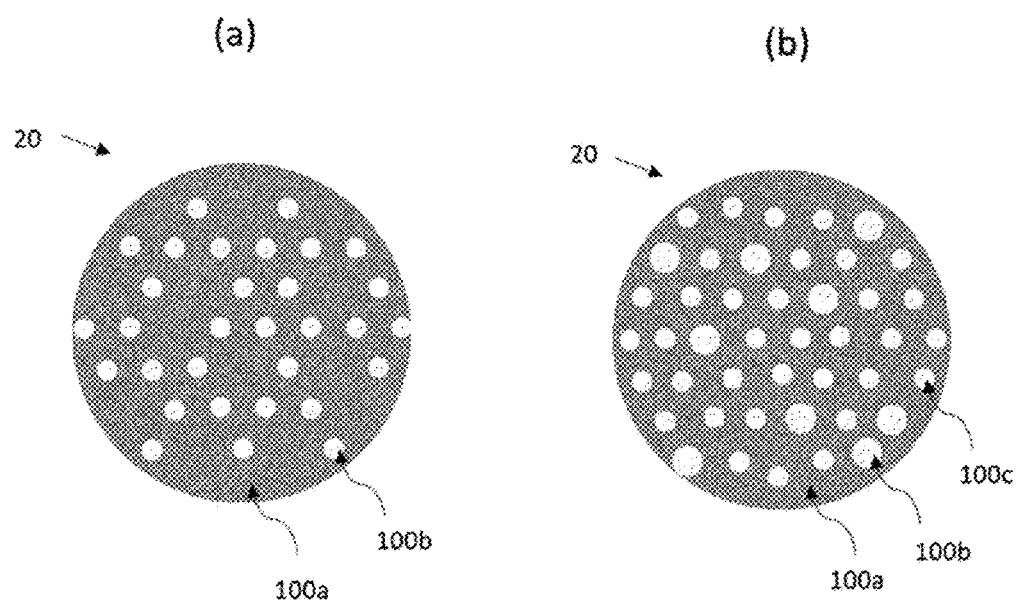
FIG. 6 shows a schematic illustration of various further possibilities for waveguides with nonuniformly arranged structure elements or cross-sectional regions thereof, wherein the waveguides each comprise a structure element of a first type and a plurality of structure elements of a second type.

FIG. 6*a* shows an image guide 20, which in each case is comparable to the image guide from FIG. 4*c* in some aspects. The image guide has a first structure element 100*a*, which may be formed e.g. as a matrix material. Further, the image guide has a multiplicity of structure elements 100*b*, which may be formed e.g. as cavities in the matrix material. The structure elements 100*b* are located on periodic places, but not all periodic places are occupied with a structure element. FIG. 6*a* thus shows a case of an image guide 20, wherein the structure elements or the cross-sectional regions thereof have a nonuniform arrangement uniquely defined by a predetermined rule. The term arrangement should be understood to the effect of the structure element or some of the structure elements or the cross-sectional regions thereof being located on periodic places, with some of the periodic places occupied and some of the periodic places unoccupied. It is possible that the structure element 100*a* comprises infrared-transmissive material. It is also possible that the structure elements 100*b* comprise infrared-transmissive material, in particular if these structure elements are formed as filled cavities. Further, both the structure element 100*a* and the structure elements 100*b* might also comprise infrared-transmissive material, wherein preferably different infrared-transmissive materials are provided for the two types.

FIG. 6*b* shows an image guide, which in each case is comparable to the image guides from FIG. 4*f* in some aspects. The image guide has a first structure element 100*a*, which may be formed e.g. as a matrix material. Further, the image guide comprises a multiplicity of structure elements 100*b* with a first diameter and a multiplicity of structure elements 100*c* with a second diameter. In this example, the structure elements are positioned aperiodically. FIG. 6*b* thus shows a case of an image guide 20, wherein the structure elements or the cross-sectional regions thereof have a nonuniform arrangement. The term arrangement should be understood to the effect that the structure element or some of the structure elements or the cross-sectional regions thereof are positioned aperiodically, and/or wherein the structure elements have a nonuniform variation among themselves, wherein the variation is formed as two types of structure elements, e.g. with different diameters. It is possible that the structure element 100*a* comprises infrared-transmissive material. It is also possible that the structure elements 100*b* and/or 100*c* comprise infrared-transmissive material, in particular if these structure elements are formed as filled cavities. Further, both the structure element 100*a* and the structure elements 100*b* and/or 100*c* might also comprise infrared-transmissive material, wherein preferably different infrared-transmissive materials are provided for the types.

Independently of the specific embodiment, in particular at least one structure element of an image guide 20 is thus transmissive for a wavelength in the infrared range, e.g. for a wavelength in the range of 1 μm to 14 μm. The image guide 20 may have a damping of less than 3 dB/m, for example, in the IR wavelength range between at least 1 μm and 14 μm.

For example, materials with or made of heavy metal oxides or chalcogenide glasses are used for the optical element or elements and/or the structure elements of the image guide. Optionally, glasses, for example multicomponent glasses, or fused quartz may also be used in the near IR range. In this case, fused quartz is not only understood to mean that consisting of pure SiO2, but also the modifications thereof, for example fluorine-doped variants which have a lower refractive index than the pure variant. The IR materials may comprise crystals or ceramics. The choice of material classes depends in particular on the temperature difference T1–T2 and the IR wavelength range and the compatibility in or for a production process for at least parts of an image guide.

In particular, the invention makes it possible to use an image guide within an IR system and, in the process, obtain better matching of the image guide to an IR system and thermal imaging technology, for example detector units or infrared cameras. In this case, the image guide may consist of a multiplicity of optical fibers which are compatible with thermal imaging technology.

While conventional IR cameras in which the motif is situated directly in front of the camera lens make use of lens elements or lens element arrangements for transmitting the signal from the motif to the detector, the invention allows the recording of IR images which are located at any desired position, e.g. around a corner, within a body or a machine, within dangerous surroundings, generally in or on locations, sites or components that are difficult to access safely or cannot be accessed safely, etc. Occasionally, this is also through an obstacle such as a housing that is only translucent or even opaque in the visible range (VIS) per se.

The NETD (Net Equivalent Temperature Difference) value can also be considered the temperature difference of the object or within a motif, which is required to create an electric signal in or at a detector or detector unit, which signal at least corresponds to the mean square noise of the detector or its image detection chip and/or the associated electronics.

In some cases, it may be expressed using the following equation:

$$NETD = \frac{4 f_\#^2 (\Delta f)^{1/2}}{A^{1/2} t_{op} M^*},$$

where the variables f# (optics number or f-number), Δf (electronics bandpass, noise equivalent electrical bandwidth), A (detector area) and M* relate to the specifications of the detector or the optical systems, inter alia the wavelength-dependent sensitivity thereof. By contrast, top is the percentage of transmission through the optics of the system (e.g. lens elements and fiber bundles). Consequently, a high transmission through the fiber bundle may contribute to a low NETD, as a result of which small temperature differences can already or still be detected, and the smallest, meaningfully detectable temperature difference of the IR imaging system can be specified.

In relation to the image resolution of an optical system, one approach consists in the measurement of the "modulation transfer function" (MTF), which measures the value of the contrast that is resolvable by the system. As a rule, this value is measured on the basis of images of black and white lines, and the contrast value is expressed in line pairs/mm. Knowledge of this value may e.g. also render an MRTD value determinable.

The contrast value M of an observed scene or of the recorded image may be defined as follows:

$$M = \frac{I_{Max} - I_{min}}{I_{Max} + I_{min}}$$

where $I_{max}$ denotes the highest signal intensity, and Imin denotes the lowest signal intensity. The MTF at a certain line frequency is the ratio of the theoretical contrast ($M_{Theoretical}$) between the object and the background to the contrast observed in the image recorded by the optical system ($M_{Image}$):

$$MTF = \frac{M_{Image}}{M_{Theoretical}}$$

The influence of an optical fiber bundle and a detector on the MTF may be significant under certain circumstances and can be characterized approximately on the basis of simple geometrical considerations. Both detectors and fiber bundles may be characterized by a two-dimensional pattern in which the elements are at a certain distance from one another, with the distance also being referred to as pitch, that is to say the distance from center to center. For example, if a detector with a pixel pitch of 15 μm is considered, then this detector is generally not able to detect contrasts at a scale or spacing of smaller than 15 μm in relation to the detector. The resolution R of a detector can be specified as follows:

$$R = \frac{1000}{2 \times \text{pitch}} [\text{lp/mm}]$$

yielding a resolution of 33 lp/mm in the mentioned example. In practice, it is desirable for the size and/or the pitch of the fibers in the bundle to correspond to the detector to the best possible extent in order to optimize the performance of the system.

Using the value of the MTF at a specific line frequency or resolution (e.g. 33 lp/mm), it is possible to calculate an MRTD (Minimum Resolvable Temperature Difference) value e.g. as follows:

$$MRTD = \frac{NETD}{MTF}$$

In other words: Proceeding from the minimum temperature difference able to create a signal and from the capability of the system to maintain the contrast with a certain efficiency, it is possible to calculate a minimum temperature difference actually observable in the recorded image.

The NETD value can also be considered to be the temperature difference between background and target which yields a signal-to-noise ratio of 1 or, stated in simplified fashion, a minimum temperature difference which can be distinguished between the background and the target. The MRTD value, which is related to the NETD value, can also be considered to be the minimum observable temperature difference between two objects.

What should also be taken into account is that the NETD value may depend on parameters which are not dependent on the image guide; for example, atmospheric conditions and the strength of the signal are external factors which depend on the scene, object or motif and which are not controllable. The pixel size and the specific detectivity depend on the quality of the detector, the spatial resolution depends on the wavelength, and the size of the aperture may be specified by the detector or using a detector unit and can determine the depth of field.

The image guide can have an influence on the strength of the signal, e.g. by way of absorption of the signal in or by way of the material thereof, that is to say the damping of the signal in or by way of the image guide or the materials comprised by the latter, and/or by way of the pixel size, e.g. if the pixels in the light guide bundle deviate from the position and/or size and/or geometry of the pixels in the detector. This is especially true if the size of the pixels in the light guide bundle is greater than or possibly even the same size as the size of the pixels in the detector. An accurate pixel-by-pixel arrangement, alignment or mapping of the pixels in the light guide vis-à-vis the pixels in the detector, for example by way of an upstream optical unit or optical element, is preferred. That is to say, should the pixels in both elements be the same size or of similar size, a substantially 1:1 alignment, arrangement or coverage is sought after, with the result that, ideally, the pixels are congruent to one another in respect of their position or coverage, for example lie opposite one another. Typically, the pixels in an image guide are substantially round or optionally embedded in substantially round fashion in a hexagonal superstructure, whereas the pixels in a detector are frequently rectangular, in particular square, and so the size of a pixel in the image guide preferably corresponds to, or at least is no larger than, the diameter of the smallest circle which can be inscribed in such rectangle, optionally even in a plurality of adjacent pixels; this therefore corresponds e.g. in the case of a square pixel in the detector to its inscribed circle.

An overdetermination of the number of pixels in the image guide vis-à-vis the number of pixels in the detector may be advantageous but may also have a disadvantageous effect if the overdetermined pixels in the image guide for example provide significantly different information in respect of the contrast, with the result that a pixel in the detector e.g. averages these, and hence blurring might be produced. Something similar may also arise if one or more pixels in the image guide reach a plurality of pixels in the detector, for example those pixels, or precisely their edges, located in the direct vicinity of the pixel addressed per se by means of the pixel or pixels in the image guide.

The properties of the detector may vary depending on the detector or manufacturer. For example, a small aperture may be chosen in order to identify an object at a distance of 100 m, for example. In the case of a weak signal, a large aperture may increase the quality of the image since more of the signal reaches the detector. Matching the image guide to further components of the system thus is advantageous.

The transmission efficiency or the transmission of the light top through an image guide can be inversely proportional to the NETD or MRTD. It is therefore advantageous to use low-loss materials for the image guide, that is to say materials with high transmission or low damping in the relevant wavelength range. This aspect depends on the purity of the materials or utilized glasses, especially for IR-transmissive materials or in the IR wavelength range. In particular, moisture and metal oxides may be causes for signal losses or high or unwanted damping in the infrared range. Impurities in the raw material, for example unwanted metals, metal compounds and other elements, may have a further negative influence on the damping; oxygen may adopt a special role in this case and, in particular, also act positively. Consequently, the selection of little-contaminated raw materials from which the materials, in particular glasses, are produced, for example molten, can make a contribution to the minimization of optical losses. By way of example, it is possible to choose raw materials with a degree of purity of 99.999%. Sometimes, such raw materials are cleaned (purified) further. To obtain the purity of the raw materials or control the change thereof in the melting process, for example in relation to their oxidation stages or formation of unwanted compounds, the glass can be produced further under specifically set melting conditions, for example by setting a specific atmosphere during or in the melting process of e.g. multicomponent glasses or fused quartz, especially in the case of chalcogenide glasses or GLS glasses in a sealed ampoule, occasionally in vacuo or in a protective gas atmosphere. This allows, for example, the amount of oxygen and moisture which comes into contact with the raw materials before and during the glass melt to be minimized or at least controlled, as are unwanted redox states of certain raw materials or compounds forming therefrom in the melt. In addition to a suitable selection of thermal (e.g. drawing temperature) and/or mechanical (e.g. drawing speed) process parameters, similar considerations can also be applied to the materials or material combinations from which an image guide is intended to be produced or is producible. That is to say, adjusting atmospheres to set or obtain the properties of the fiber or the image guide may be advantageous and necessary even during a drawing process for producing corresponding optical fibers or for already producing fiber-optic components, for example rigid image guides made of a plurality of image-guiding elements.

As described above, it is advantageous if pixel dimension and pixel pitch of the image guide or fiber bundle and of the detector substantially correspond. However, the proximity of the fibers with respect to one another and, in particular, the pitch of the cores in the bundle may also play a role, which may be disadvantageous e.g. if the choice of materials is unsuitable, for example in terms of their refractive index difference. In particular, it may be the case that the signal which runs through one of the cores of the bundle is not delimited well from an optical point of view on account of the refractive index difference vis-à-vis the cladding and/or on account of the diameter of the cladding, that is to say ultimately the pitch of adjacent cores. This may lead to signal crosstalk between two or more cores, even though a physical barrier, specifically the cladding, exists therebetween. This effect is referred to as crosstalk (X-Talk). Crosstalk between pixels in the image guide can thus contribute to a deterioration in the image transmission since, firstly, parts of the signal which should be transmitted via one pixel are no longer contained in this pixel at the distal end thereof and accordingly can be presented only less intensely or transmitted only less intensely to the detector;

secondly, these signal components can be transmitted in neighboring pixels and are superimposed there on the signal which should in fact be transmitted using this pixel or the associated image guide element. Hence, the signal (image) to be transmitted overall may be dampened, and its contrast and sharpness may be reduced.

As mentioned previously, crosstalk can be influenced and/or minimized, for example by the choice of materials for core and cladding and their difference in terms of refractive index. This can be used e.g. to obtain a high packing density of the image-guiding elements or increase or at least predetermine the fiber density in the bundle and hence increase or at least predetermine the surface of the distal end face of the fiber bundle or image guide usable for imaging, and/or match this usable surface to a detector or its pixel size and pitch.

In respect of crosstalk, there are in principle a number of ways of describing the crosstalk in a bundle of optical fibers, with the peculiarities of thermal imaging technology not being considered as a rule.

For example, an image guide having the predetermined properties can be produced or is producible from a first chalcogenide glass with an refractive index n1 of approx. 2.42 as a core and from a cladding made of a second chalcogenide glass which is modified in relation to the first, for example in terms of the composition thereof, so that its refractive index n2, at approx. 2.39, is less than the refractive index n1. Relatively large refractive index differences can be achieved if, for example, a multi-component glass is used as cladding material, the multi-component glass of the cladding having sufficient thermomechanical and/or chemical compatibility with the core glass such that an image guide can be produced or is producible therefrom in an appropriate process, as known from the production of fiber optical components.

The selection of the initial geometries, in particular the diameter of what is known as the core rod and of the so-called cladding tube and the wall strength thereof, and the composition of some or a multiplicity of such core-cladding combinations to form a preform allow the further parameters of the image guide to be predetermined within relatively broad boundaries and to be prepared, for example depending on the process temperature (drawing temperature) and drawing speed, optionally depending on the number of successive drawing processes, in what is known as multi- or multi-multi drawing. This allows the number of pixels of the image guide, the size and the pitch thereof, etc., to be set so that these are matched to or for a detector unit, as described above.

The invention claimed is:

1. An infrared image system, comprising:
a lens for generating an image of a motif with at least two different temperatures T1 and T2,
an image guide for image transmission, a distal end of the image guide being assigned to the lens,
a detector unit for image capture, the detector unit being assigned to a proximal end of the image guide,
the ratio of the joint thermal resolution (NETD) of the image guide and the detector unit to the thermal resolution (NRTD) of the detector unit being less than 10, wherein the detector unit has a thermal resolution (NETD) which is less than 300 mK.

2. The infrared image system according to claim 1, wherein the detector unit has a thermal resolution (NETD) which is less than 200 mK, and/or wherein the image guide and the detector unit have a joint thermal resolution (NETD) which is less than 400 mK.

3. The infrared image system according to claim 1, wherein the detector unit has a detectivity of at least $10^8$ cm $Hz^{1/2}$ $W^{-1}$, for a wavelength in the infrared range, and/or wherein the detector unit has a resolution of at least 20 line pairs/mm and/or wherein the detector unit has an area of at least 0.1 square centimeters.

4. The infrared image system according to claim 1, further comprising an optical element arranged between the proximal end of the image guide and the detector unit and/or wherein the detector unit is embodied as a screen and the optical element is designed for image projection onto the screen and/or wherein the image guide of the infrared image system is embodied.

5. The infrared image system according to claim 1, wherein the ratio of the joint thermal resolution (NETD) of the image guide and the detector unit to the thermal resolution (NRTD) of the detector unit is less than 5.

6. The infrared image system according to claim 1, wherein the ratio of the joint thermal resolution (NETD) of the image guide and the detector unit to the thermal resolution (NRTD) of the detector unit is less than 2.

7. The infrared image system according to claim 5, wherein the image guide and the detector unit have a joint thermal resolution (NETD) which is less than 100 mK.

8. The infrared image system according to claim 2, wherein the image guide and the detector unit have a joint thermal resolution (NETD) which is less than 300 mK.

9. The infrared image system according to claim 8, wherein the image guide and the detector unit have a joint thermal resolution (NETD) which is less than 200 mK.

10. The infrared image system according to claim 3, wherein the detector unit has a detectivity of at least $10^9$ cm $Hz^{1/2}$ $W^{-1}$.

11. The infrared image system according to claim 10, wherein the detector unit has a detectivity of at least least $10^{10}$ cm $Hz^{1/2}$ $W^{-1}$.

12. The infrared image system according to claim 8, wherein the detector unit has a detectivity of at least least $10^{11}$ cm $Hz^{1/2}$ $W^{-1}$.

13. The infrared image system according to claim 3, wherein the detector unit has a resolution of at least 50 line pairs/mm.

14. The infrared image system according to claim 13, wherein the detector unit has a resolution of at least 150 line pairs/mm.

15. The infrared image system according to claim 3, wherein the detector unit has an area of at least 0.5 square centimeters.

16. The infrared image system according to claim 3, wherein the detector unit has an area of at least 5 square centimeters.

17. The infrared image system according to claim 3, wherein the wavelength in the infrared range is from 0.8 μm to 14 μm.

* * * * *